(12) United States Patent
Kashyap

(10) Patent No.: US 6,307,679 B1
(45) Date of Patent: Oct. 23, 2001

(54) FORMATION OF A REFRACTIVE INDEX GRATING

(75) Inventor: Raman Kashyap, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/011,995

(22) PCT Filed: Dec. 12, 1996

(86) PCT No.: PCT/GB96/03079

§ 371 Date: Mar. 9, 1998

§ 102(e) Date: Mar. 9, 1998

(87) PCT Pub. No.: WO97/22023

PCT Pub. Date: Jun. 19, 1997

(30) Foreign Application Priority Data

Dec. 12, 1995 (EP) ................................................ 95309031
Mar. 29, 1996 (GB) ................................................ 9606781

(51) Int. Cl.[7] .............................. G02B 5/18; G02B 5/32; G02B 27/42; G03H 1/02
(52) U.S. Cl. .................................. 359/569; 359/8; 359/15; 359/16; 359/558
(58) Field of Search .................................... 359/558, 559, 359/562, 569, 8, 15, 16; 385/37

(56) References Cited

U.S. PATENT DOCUMENTS

| | | | |
|---|---|---|---|
| 4,148,549 | * 4/1979 | Termanis | 359/15 |
| 5,210,807 | 5/1993 | Ames | 385/24 |
| 5,218,651 | * 6/1993 | Faco et al. | 385/37 |
| 5,309,260 | * 5/1994 | Mizrahi et al. | 359/569 |
| 5,388,173 | 2/1995 | Glenn | 359/10 |

FOREIGN PATENT DOCUMENTS 2 209 408 A    5/1989 (GB).

OTHER PUBLICATIONS

Electronics Letters, vol. 31, No. 3, Feb. 2, 1995, pp. 223–225, Malo et al., "Apodised In–Fibre Bragg Grating Reflectors Phtoimprinted Using A Phase Mask".
Electronics Letters, vol. 31, No. 3, Feb. 2, 1995, pp. 222/223, Albert et al., "Aposidation of the Spectral Response of Fibre Bragg Gratings Using Phase Mask with Variable Diffraction Efficiency".
Electronics Letters, vol. 31, No. 3, Feb. 2, 1995, pp. 171/172, Painchaud et al., "Chirped Fibre Gratings Produced by Tilting the Fibre".
Electronics Letters, vol. 31, No. 1, Jan. 5, 1995, Stevenage, UK, pp. 60/61, Byron et al., "Fabrication of Chirped Fibre Gratings by Novel Stretch and Write Technique".
Cole, Moving Fibre/Phase Mask–Scanning Beam Technique for Enhanced Flexibility in Producing Fibre Gratings with Uniform Phase Mask, Electronics Letters, Aug. 17, 1995, vol. 31, No. 17, pp. 1488–1490.
Kashyap, Invited Paper "Photosensitive Optical Fibres: Devices and Applications", Optical Fiber Technology, 1, 17–34 (1994).

* cited by examiner

Primary Examiner—Cassandra Spyrou
Assistant Examiner—Jennifer Winstedt
(74) Attorney, Agent, or Firm—Nixon & Vanderhye, P.C.

(57) ABSTRACT

An apodised refractive index grating is recorded in a photosensitive optical fiber by forming first and second component interference patterns with different pitches, that are recorded in the grating such as to result in apodisation. The component patterns are spatially in phase in a central region and move progressively out of phase towards the ends of the patterns. The patterns may be recorded sequentially or concurrently. The fiber may be stretched once or cylically.

9 Claims, 10 Drawing Sheets

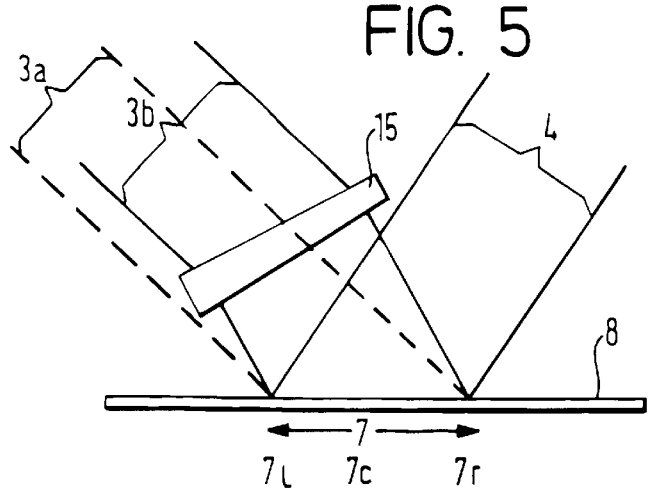
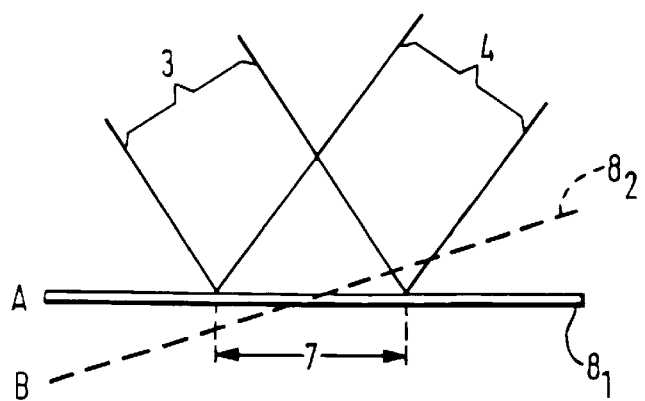
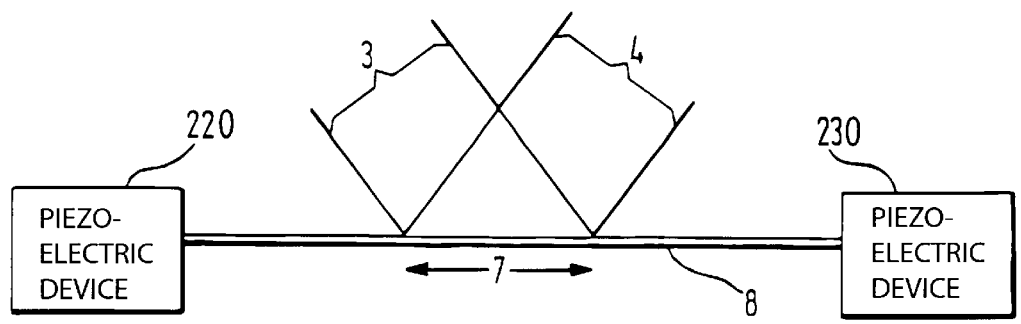

FIG. 11
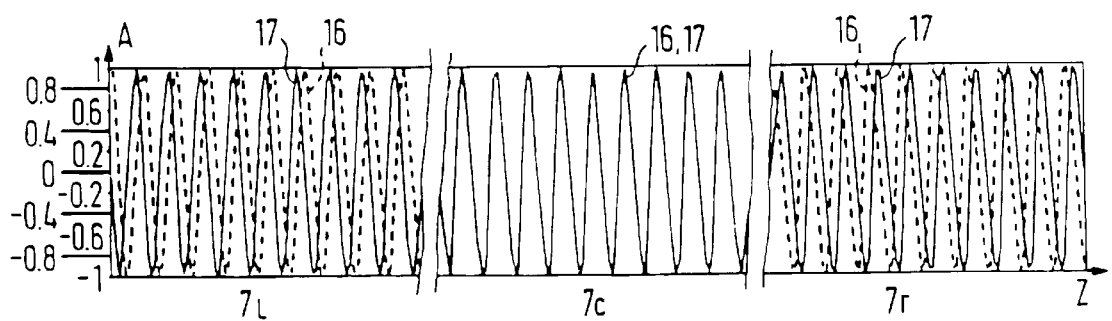
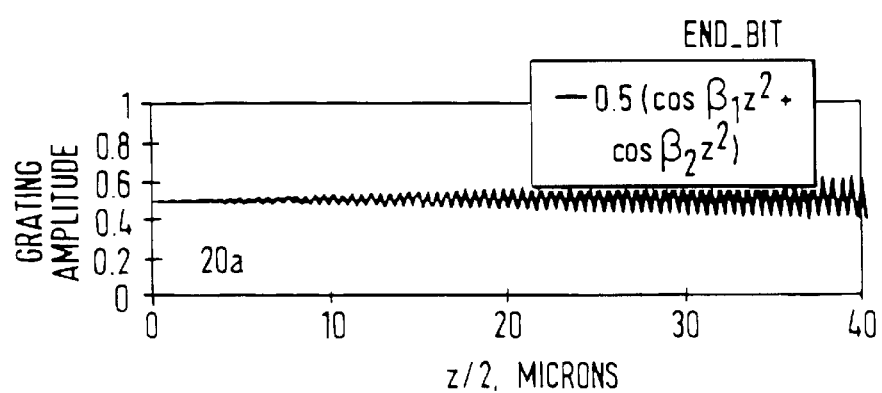
FIG. 13

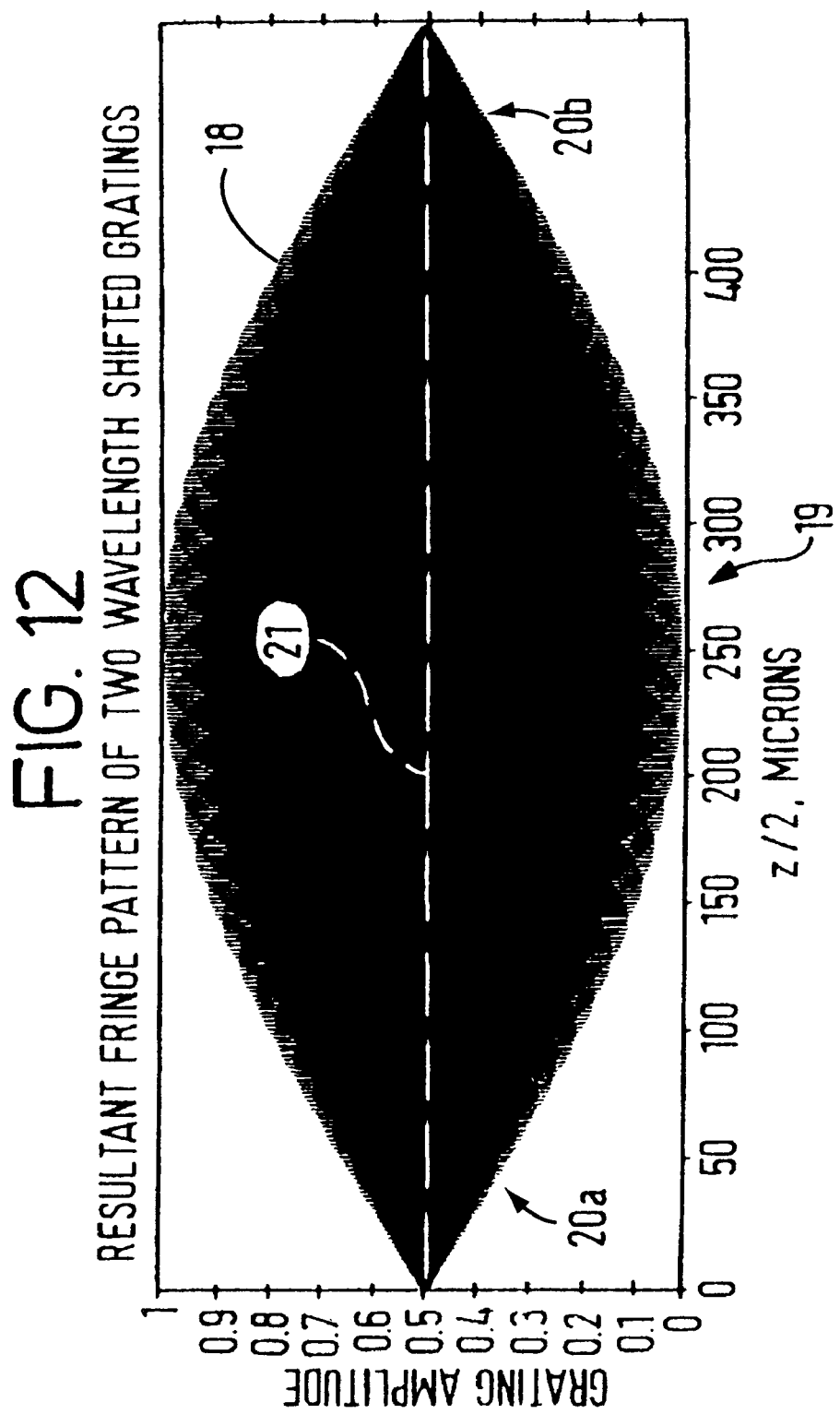

FORMATION OF A REFRACTIVE INDEX GRATING

FIELD OF THE INVENTION

1. Background

This invention relates to a method of recording an apodised refractive index grating in a photosensitive optical medium and has particular but not exclusive application to forming gratings in optical fibres.

2. Related Art

It is known that the refractive index of an optical fibre can be altered by exposing it to high intensity light. Germanium doped fibre exhibits a photosensitivity in this manner and the effect can be used to form a so-called refractive index grating in the fibre. Reference is directed K. O. Hill et al, "Photosensitivity in Optical Waveguides: Application to reflection filter fabrication", Appl. Phys. Lett., Vol 32, no. 10, 647 (1978). The grating can be produced by forming an optical interference pattern with two interfering beams, and exposing the optical fibre to the interference pattern, so as to record a grating in the fibre.

The interference pattern may be formed by directing an optical beam longitudinally through the fibre and reflecting it back along its path through the fibre, so as to produce a standing wave pattern, which becomes recorded in the fibre due to its photosensitivity. In an alternative method, beams derived from a coherent source are directed transversely of the length of the fibre, so as to interfere with one another and produce an interference pattern externally of the fibre, which becomes recorded in the fibre as a result of its photosensitivity. A block for producing an external interference pattern for this purpose is described in EP-A-0523084.

Another way of forming the grating is to use a phase mask in which the desired amplitude pattern has been recorded holographically as a mask pattern. The phase mask is placed adjacent to the fibre and the illuminated laser light, so as to expose the fibre to the holographic pattern. Reference is directed to K. O. Hill et al "Bragg grating fabricated in monomode photosensitive fiber by u.v. exposure through a phase mask" Appl. Phys. Lett. Vol. 62, No. 10, 1035 (1993).

For a general review of refractive index gratings, reference is directed to "Photosensitive Optical Fibres: Devices and Applications" R. Kashyap, Optical Fiber Technology 1, 17–34 (1994).

Also, reference is directed to U.S. Pat. No. 4,474,427 to Hill and PCT/GB91/01968 (WO92/08999) which disclose the formation of more than one refractive index grating pattern in a common optical fibre.

Refractive index gratings, which operate as Bragg gratings, have many applications in optical data communication systems as discussed by Kashyap, supra, and in particular can be used as wavelength filters. It is well known that the large bandwidth offered by an optical fibre can be used to transmit data at a number of different wavelengths, for example by wavelength division multiplexing (WDM). It has been proposed to use refractive index gratings to separate information from adjacent WDM channels. Conventionally, optical telecommunication networks transmit data in channels centred on 1.3 $\mu$m and 1.5 $\mu$m. In either of these wavelength regions, a Bragg grating can be used to reflect out a narrow wavelength channel of the order of 1 nm or less, in order to permit WDM demultiplexing. A series of gratings can be provided to select individual closely spaced channels. The gratings exhibit a main wavelength peak centred on the wavelength of the channel to be filtered, but each grating also exhibits a series of side lobes at harmonics of the wavelength peak, which produce reflection in adjacent channels, resulting in cross-talk. As a result, it has proved necessary to apodise the Bragg gratings so as to suppress the effect of the side lobes and reduce the cross-talk.

Prior apodisation techniques will now be discussed. Referring to FIG. 1, this shows a conventional method of forming a refractive index grating in an optical fibre, in which light from a laser source 1 is fed through a beam splitter 2 in order to form coherent beams 3, 4, which are directed by a mirror arrangement 5, 6 so as to interfere with one another in region 7 adjacent to an optical fibre 8 which exhibits photosensitivity at the wavelength of operation of the laser 1. The result is an optical interference pattern, which is recorded in the fibre as a result of its photosensitivity. The result of the recording is shown in FIG. 2. The spatially periodic intensity of the interference pattern produces a corresponding pattern of refractive index variations along the length of the fibre, which in FIG. 2 are schematically shown as refractive index regions $n_1$ and $n_2$. These regions act as a reflection grating in a manner well known per se. The grating has a wavelength dependent reflection characteristic with a main lobe centred at a particular wavelength depending upon the periodic spacing of the refractive index regions $n_1$, $n_2$, together with a series of side lobes at harmonics of the centre wavelength. The reflection wavelength $\lambda_{Bragg}$ is given by $$\lambda_{Bragg} = 2 \Lambda n_{eff}/N$$

where $\Lambda$ is the period of diffraction pattern and $n_{eff}$ is the effective refractive index of the waveguide. N is an integer.

Referring to FIG. 2b which shows the variation in refractive index recorded in the fibre, the spatially periodic function has an envelope 10 which in the simple example shown in FIG. 2b is theoretically flat for an infinitely long grating. This is shown again in FIG. 3a, with the periodic function omitted. The overall refractive index exhibited by the fibre $n_{eff}$ is at a reduced value 14 as shown in FIG. 3a. The corresponding spectral characteristic for the grating, i.e. the response in the wavelength domain, is shown in FIG. 3b and it can be seen that the grating exhibits a main lobe 11 and a series of side lobes on either side of the main lobe. When the grating is used as an optical filter e.g. in a WDM demultiplexer, the spacing of the grating pattern is chosen so that the main lobe 11 corresponds to the centre wavelength of the WDM channel, but a problem arises in that the side lobes extend into adjacent wavelength channels for the WDM system, particularly when the channels are closely spaced in wavelength. The side lobes thus will produce reflection in the adjacent channels and result in cross-talk.

Apodisation suppresses the effect of the side lobes. This has been achieved hitherto in a number of different ways. Referring to FIG. 1, the grating pattern formed in the region 7 will not in fact have a constant amplitude along its length and as a result, the refractive index pattern recorded in the fibre does not in practice have a flat envelope 10 as shown in FIG. 3a. Actually, the beams 3, 4 have an approximately Gaussian amplitude spread across their physical width, with the result that the envelope 10 in practice has a shape more like that shown in FIG. 4a. It can be shown that suppression of the side lobes will be achieved if the envelope 10 has a shape which tapers from a central region towards its opposite ends, for example in accordance with the function $\cos^2 z$ along the length z of the recorded grating. In the past, this has been attempted by modifying the amplitude distribution across the width of the beams 3, 4. The corresponding spectral response of the filter is shown in FIG. 4b, from which it can be seen that the effect of side lobes is suppressed.

For gratings recorded in a phase mask, apodisation has been achieved by varying the intensity of the pattern across the mask, or by selective destruction of the phase pattern recorded in the mask. Reference is directed to "Apodised in-fibre Bragg grating reflectors photoimprinted using a phase mask", B. Malo et al Electronics Letters Feb. 2, 1995, Vol 31, No. 3, pp 223–225; and also to "Apodisation of the spectral response of fibre Bragg gratings using a phase mask with variable diffraction efficiency", J. Albert et al, Electronics Letters, Feb. 2, 1995, Vol 31, No. 3 pp 222–223.

However, a problem with all of these prior techniques is that the side lobes are not suppressed completely, due to the fact that the overall refractive index exhibited by the fibre $n_{eff}$ varies along the length z of the grating. It will be recalled that the value of refractive index n recorded in the fibre is a function of the intensity of the illuminating light, so that with the configuration shown in FIG. 4a, the effective refractive index neff varies along the length of the grating in a non-uniform manner. This non-uniform variation itself produces chirp in the Bragg wavelength of the grating, and as a result side lobes in the spectral response of the structure.

Hitherto, post-processing techniques have been used in order to linearize $n_{eff}$. However, these techniques have been difficult to implement in practice. Reference is directed to Hill et al, supra.

An alternative apodisation technique has recently been proposed in "Moving fibre/phase mask scanning beam technique for enhanced flexibility in producing fibre gratings with uniform phase mask" M. J. Cole et al, Electronics Letters, Aug. 17, 1995, Vol 31, No. 17, pp 1488–1490. In this technique, the grating is recorded in a manner generally shown in FIG. 1 and, additionally, a piezoelectric device is moved along the fibre from a central position in the grating, during its formation, so as to apply vibration to the fibre, the amplitude of which increases towards the exterior edges. In this way, the recorded pattern is "blurred" towards the ends of the recorded grating which has the effect of apodising the grating, but without reducing the intensity of the recording light towards the ends of the grating as in the previously described methods, with the result that $n_{eff}$ need not vary significantly along the length of the grating.

A method of providing a surface relief diffraction grating for use in a distributed feedback (DFB) optical fibre laser is described in GB-A-2209408. The grating is formed by exposing a layer of photoresist on an optical fibre to two different optical interference patterns of different periodicities, produced by interfering beams of optical radiation. The resulting, exposed composite pattern formed in the photoresist is then developed, and the fibre is etched using the developed pattern as a mask, to provide a surface relief pattern in the fibre. The two component patterns are chosen so as to support a common longitudinal mode in the output of the laser. However, the configuration does not produce apodisation because the surface grating pattern has an effective refractive index which varies along the length of the optical fibre, which results in unwanted sidelobes in the wavelength characteristic.

SUMMARY OF THE INVENTION

The present invention provides a technique for controlling the spectral characteristic of a refractive index grating recorded in a photosensitive optical medium, which can be used to produce apodisation.

The present invention provides a method of recording an apodised refractive index grating in a photosensitive optical medium with a pattern of optical radiation, comprising producing a plurality of spatially periodic component optical patterns for forming the grating, with a relative spatial phase which varies along the length thereof in such a manner as to result in apodisation of the grating recorded in the optical medium.

In accordance with the invention, the effective refractive index of the optical medium may be substantially constant along the length of the recorded grating, so as to provide effective apodisation.

The relative phase of the component patterns may progressively increase in directions along the patterns away from an intermediate region towards ends thereof. The patterns may have zero relative phase in the intermediate region, and a relative phase of $\pm\pi/2$ with respect to the spatial periodicity of the pattern, at the ends thereof.

The overlying component patterns may be formed sequentially. They may comprise optical interference patterns. The interference patterns may be formed by causing beams of optical radiation to interfere to produce a first of the patterns, and thereafter introducing a phase shift across the width of at least one of the beams, so as to form a second of the interference patterns. An optically transparent wedge may be used to introduce the phase shift.

Alternatively, the optical medium may be moved relative to the pattern, so as to provide the first and second component patterns. The waveguide in one example is rotated through a small angle, and in another, is stretched between recording the patterns in the optical medium.

The component optical patterns may be formed concurrently. For example beams of optical radiation with a predetermined spectral content may be caused to interfere so that light at different wavelengths interferes to produce the component patterns concurrently.

In another method, the component patterns are derived from corresponding patterns recorded in a phase mask.

The invention has particular application to recording an apodised grating in an optical waveguide such as photosensitive optical fibre e.g. a germanium doped fibre that is photosensitive to u.v. radiation. The recording method according to the invention has the advantage that the recorded pattern is both apodised and has an average intensity which need not vary significantly along the length of the pattern, so that the average refractive index $n_{eff}$ need not vary, thereby avoiding chirp and resultant cross talk.

BRIEF DESCRIPTION OF THE DRAWINGS

In order that the invention may be more fully understood, embodiments thereof will now be described, reference being had to the accompanying drawings in which:

FIG. 5 is a schematic illustration of apparatus for recording a grating by a first method according to the invention;

FIG. 6 illustrates apparatus for recording a grating by a second method in accordance with the invention;

FIG. 7 is a schematic illustration of the recording of a grating by a third method in accordance with the invention;

FIG. 11 illustrates first and second component interference patterns for recording the grating;

FIG. 12 is a schematic illustration of the combination of the intensities of the first and econd component interference patterns;

FIG. 13 is an enlarged view of the pattern shown in FIG. 12, adjacent the end 20a;

DETAILED DESCRIPTION OF EXEMPLARY EMBODIMENTS

Figure 1:
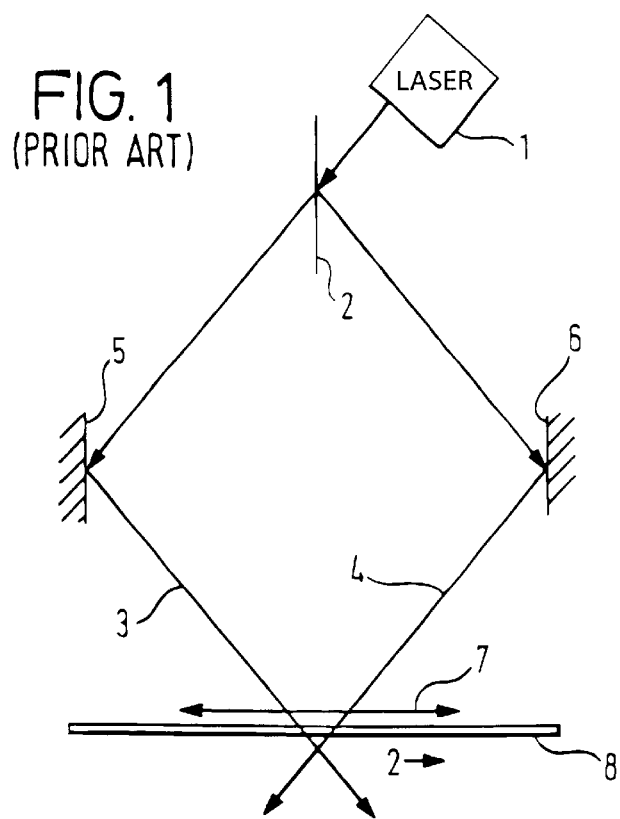
FIG. 1 illustrates a prior art method of forming a refractive index grating in an optical fibre.
Figure 2A:
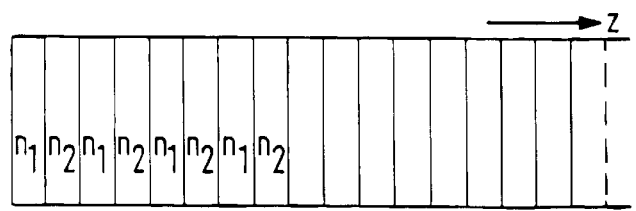
FIG. 2a illustrates the refractive index pattern of the grating formed in the fibre.
Figure 2B:
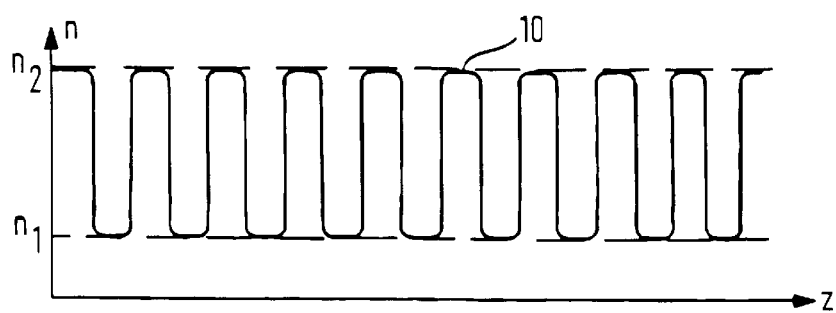
FIG. 2b is a graph of the refractive index variation along the length of the fibre.
Figure 3A:
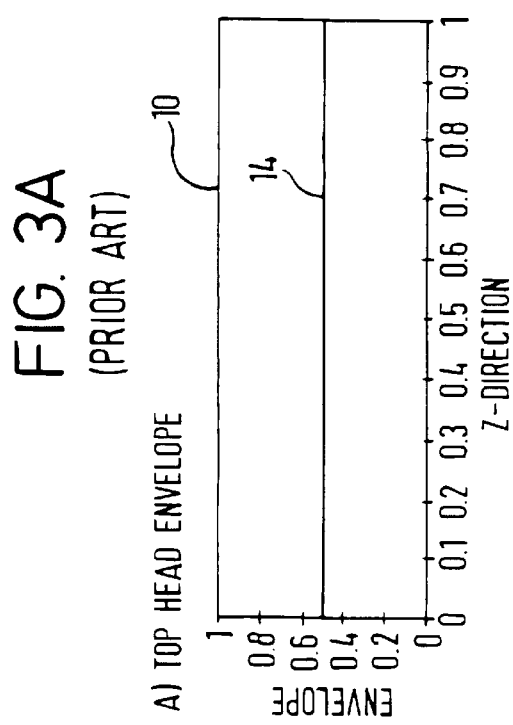
FIG. 3a illustrates the envelope of the refractive index variation along the length of the fibre.
Figure 3B:
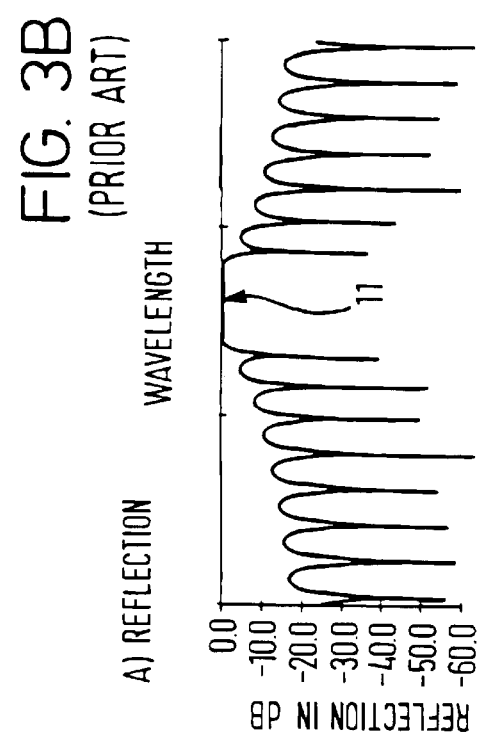
FIG. 3b illustrates the corresponding spectral characteristic of the grating.

A first example of a grating formation method in accordance with the invention will now described with reference to FIG. 5. The method can be considered as a modification of the method described with reference to FIG. 1, in which like parts are marked with the same reference numbers. The two interfering beams 3, 4, which, in FIG. 5 are shown to have a given width, interfere in region 7 to form an interference pattern which is recorded in the optical fibre 8 in the manner generally as previously described. The laser 1, beam splitter 2 and mirrors 5, 6 have been omitted from FIG. 5 in order to simplify the drawing.

In accordance with the invention, first and second component interference patterns are produced and individually recorded in the fibre so as to produce the apodisation of the grating. The component grating patterns have slightly different spatial periodicities, chosen so that their combined effect is to suppress the side lobes in the wavelength response of the recorded grating, as will be explained more fully hereinafter.

In FIG. 5, the first component interference pattern is recorded in the fibre by producing interference between beam 4 and beam 3a shown in dotted outline. Thereafter, a transparent wedge 15 placed in the beam 3 in order to introduce a progressive phase shift in the wavefront of the beam across its width. This interferes with the beam 4 to produce a second component interference pattern. There is a progressive small increase in spacing between the successive peaks and troughs of the second interference pattern in comparison with the first pattern and this will be explained in more detail hereinafter with reference to FIG. 11. Thus, the second, slightly different pattern is recorded in the fibre 8, overlying the first pattern formed by the beams 3a, 4. In order to form the second component pattern, the beam 3 may need to be shifted to the position 3b shown in FIG. 5 in order to produce the correct overlying alignment of the first and second component patterns.

Referring now to FIG. 11, this shows the amplitude of the first and second component interference patterns 16, 17 that are produced. The first pattern 16 is shown in dotted outline whereas the second pattern 17 is shown as a solid line. FIG. 11 shows the component patterns at three positions across the width of the interference pattern 7, namely at the left side $7_l$ the centre $7_c$ and the right side $7_r$. The second component pattern 17 has a slightly different periodicity from the pattern 16 due to the phase shift introduced by the wedge 15. In the central region $7_c$, the patterns overlie one another, but due to their different periodicities, they become progressively out of phase towards the side edges of the interference pattern so that in positions $7_l$ and $7_r$, the patterns are out of registry, as shown in FIG. 11.

Figure 4A:
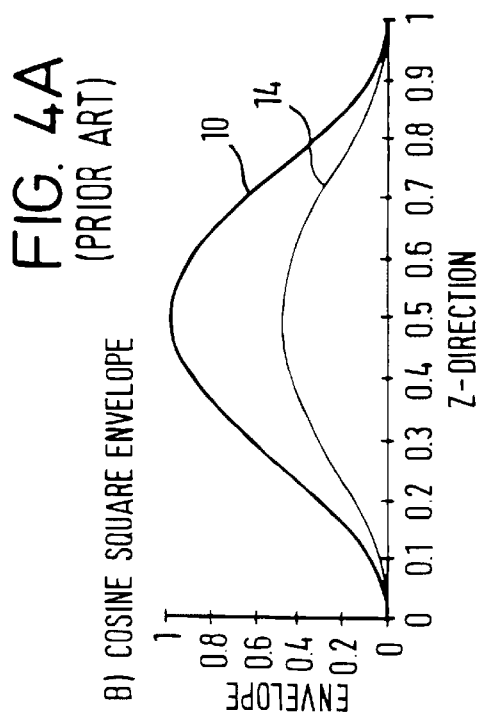
FIGS. 4a and 4b correspond to FIGS. 3a and 3b, but for an amplitude mask apodised grating.
Figure 4B:
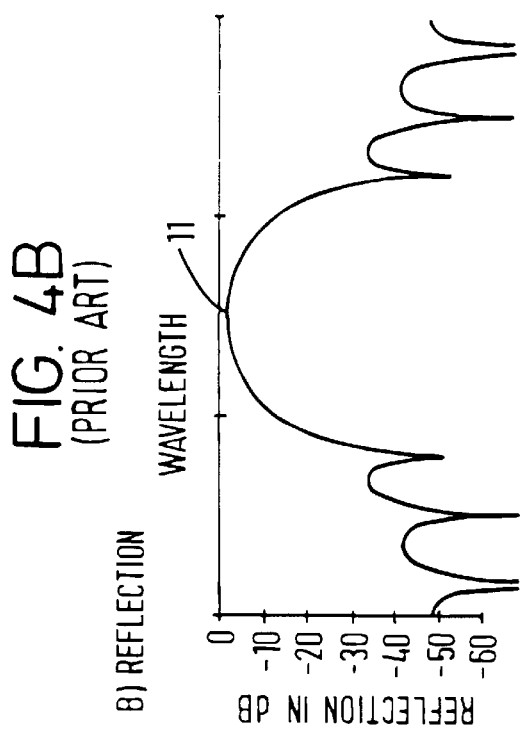
Figure 14:
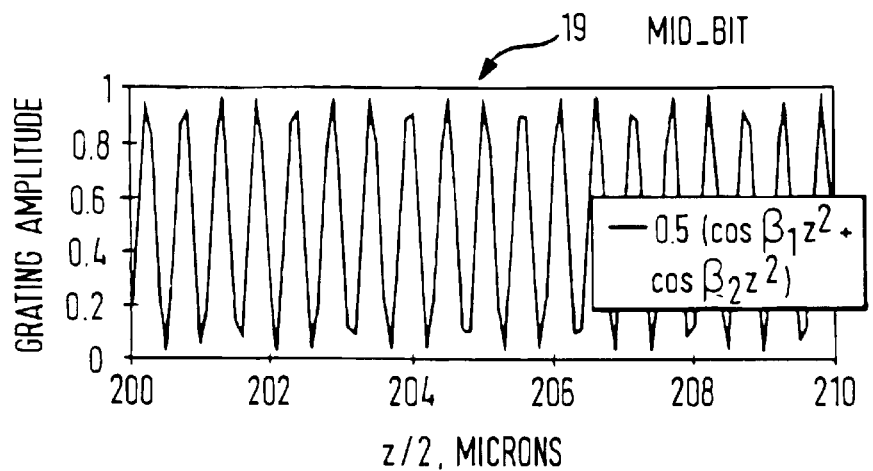
FIG. 14 is an enlarged view of the pattern shown in FIG. 12, for the central region 19.

It will be understood that the combination of the intensities corresponding to the two amplitude patterns 16, 17 shown in FIG. 11 is recorded in the photosensitive waveguide 8 (FIG. 5) as variations in the refractive index of the waveguide. The resultant combined intensity pattern produced by the component amplitude patterns 16, 17 is shown in FIG. 12 and consists of a spatially periodic function having an envelope 18. The value of the cyclic spatial intensity variations for the function shown in FIG. 12 is highest in a central region 19 of the function and progressively decreases towards the opposite ends 20a, 20b in the direction z along the waveguide. A more detailed view of the intensity function of FIG. 12 adjacent the end 20a is shown in FIG. 13 and a more detailed view of the region 19 is shown in FIG. 14. The refractive index grating produced by this intensity pattern is thus apodised as a result of the shape of the envelope 18. Furthermore, the shape of the envelope 18 has the advantage that the average intensity remains constant along the length z so that $n_{eff}$ is substantially constant along the length of the grating, which minimises side lobes in the grating characteristics produced by chirp that was described previously with reference to FIG. 4A.

A more detailed discussion of the function shown in FIGS. 12 to 14 will now be given. The spatially periodic amplitude of the first and second component interference patterns 16, 17 in the direction z will be referred to as $A_1(z)$ and $A_2(z)$, and the resultant intensity pattern I(z) shown in FIG. 12 can be written as the sum of the squares of the intensity patterns, i.e.

$$I(z) = \frac{K}{2}(A_1^2 + A_2^2) \quad (1)$$

where K is a constant.

Each of amplitudes $A_1(z)$ and $A_2(z)$ can be represented as a spatial cosine function, i.e.

$$A \sim \cos \beta z$$

where the period Λ of the diffraction grating pattern is given by:

$$\Lambda = 2\pi/\beta$$

Thus $A_1 = p \cos \beta_1 z$ \quad (2)

and $A_2 = q \cos \beta_2 z + tm$ (3)

where p and q are constants.

From equations (1), (2) and (3), it follows that $$I(z) = K/2(p^2 \cos^2\beta_1 z + q^2 \cos^2\beta_2 z)$$

where K is a constant
which can be written as $$I(z) = K/2(p^2 \cos^2\beta_1 z + Q^2 \cos^2 z) \quad (4)$$

where P and Q are constants. For the purpose of simplicity in the following analysis K, P and Q are assumed to be of value 1.

The form of equation (4) will now be considered in detail by way of example at the end of point 20*a* and in the central region 19 in order to explain the refractive index variations that are recorded in the waveguide as a grating pattern.

In the central region 19, the two component patterns 16 and 17 are substantially in phase, with the same spatial periodicity, so that in region 19 $\beta_1 = \beta_2 = \beta$. Thus, equation (4) reduces to $$I_{(19)} = \frac{1}{2}(\cos^2\beta z + \cos^2\beta z)$$

i.e. $I_{(19)} = \cos^2\beta z$

It can be shown that over one spatial period of the pattern i.e. $\beta = 0 \to 2\pi$, the intensity $I_{(19)}$ has an average value $<I_{(19)}> = \frac{1}{2}$ in the arbitrary units of this analysis.

Considering now the end point 20*a* of the envelope 18, the patterns 16, 17 are arranged to become progressively out of phase from the in-phase condition in region 19, so that at the opposite ends of the envelope, e.g. at end point 20*a*, the patterns are 90° out of phase, i.e. $\beta_1 = \beta_2 + \pi/2 = \beta$. Thus, at the end point 20*a*, equation (4) reduces to:

$$I_{20} = 1/2(\cos^2\beta^2 + \cos^2(\beta z + \pi/2))$$
$$= 1/2(\cos^2\beta z + \sin^2\beta z)$$
$$= 1/2 \text{ (in the arbitrary units of this analysis)}$$

It will be therefore understood from the foregoing, and from an inspection of FIG. 12, that the average intensity is constant along the z dimension of the envelope 18, shown as line 21. Thus $n_{eff}$ as recorded in the fibre 8, is constant along its length, which avoids chirp that would arise if $n_{eff}$ were to vary.

In an example of a grating recorded in a germanium doped photosensitive fibre 8, u.v. light from a laser operating c.w. ~100 mw at a wavelength of 244 nm produced the first interference pattern 16 in region 7 of FIG. 5, of a length z=4–6 mm and a transverse dimension of 40 μm. The spatial period of the interference pattern was of the order of 1 μm. Then, the wedge 15 was inserted into beam 3 in order to produce the second pattern 17. The wedge was made of $SiO_2$ with a refractive index n=1.46, and a wedge angle of 5" of arc. The second pattern 17 was spatially in phase with the first pattern in the central region 19 and the relative spatial phase of the patterns progressively increased outwardly from the central region 19 towards the ends 20*a*, 20*b* where the phase difference was π/2. The optical fibre consisted of a silica fibre with an outside diameter of 125 μm, codoped with Ge/B to provide a core of 4 μm diameter. The exposure time for each component pattern was approximately ten minutes.

Figure 15:
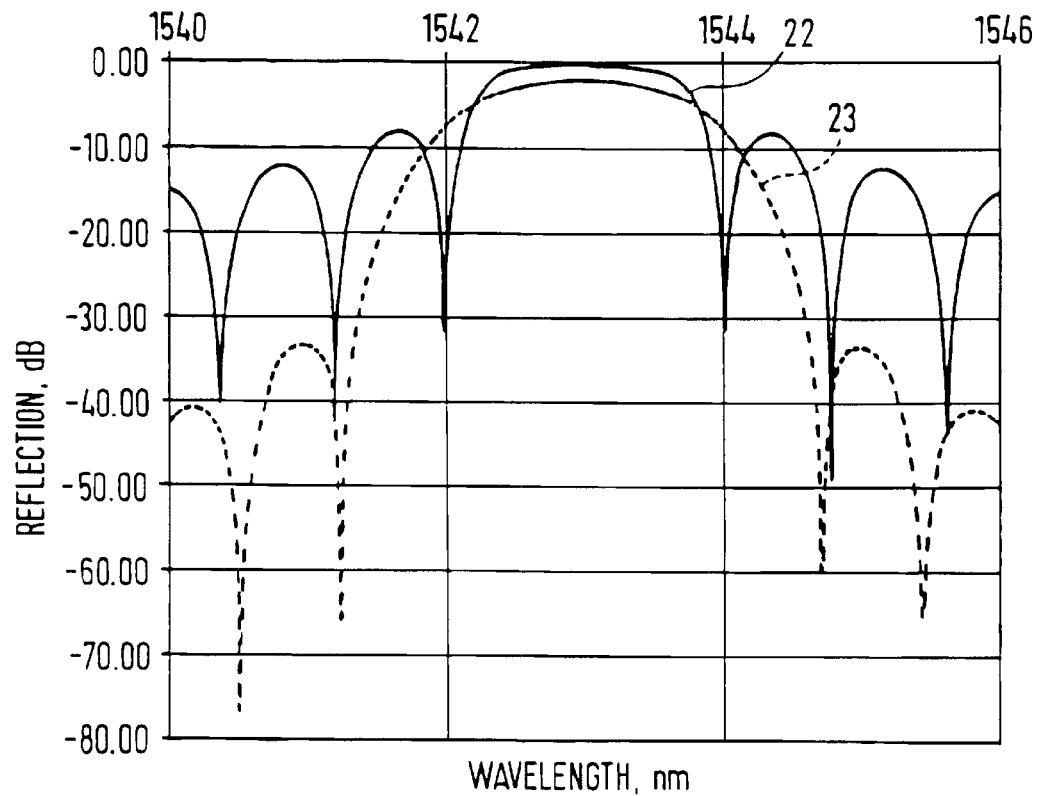
FIG. 15 is a graph of the wavelength response of the apodised grating recorded by the method of the invention, in reflection along the optical fibre.

The resultant spectral characteristic of the apodised grating recorded in the fibre 8 is shown in FIG. 15, as trace 23.

For comparison purposes, the wavelength characteristic for a grating produced by only one of the patterns 16 or 17 is shown as trace 22, from which the suppression of the side lobes produced by the apodisation can be clearly seen. The characteristics shown in FIG. 15 were determined by launching relatively broadband laser radiation along the core of the fibre 8 and measuring the spectral response of the radiation reflected by grating, using conventional techniques.

Referring now to FIG. 6, the second method of recording an apodised grating in accordance with the invention will now be described. This can be considered as a modification of the method described with reference to FIG. 5. In the method of FIG. 6, the beams 3, 4 produce interference in region 7, in the manner described previously. The first interference pattern is recorded in the fibre 8 when it is in position A so that the fibre is in position 8$_1$. Thereafter, the fibre is moved through a small angle e.g. ~3° for a pattern of length z=4 mm, and the second pattern is recorded, whilst the fibre is in position B, lying along line 8$_2$ shown in dotted outline. The plane in which the fibre is rotated may lie within the beams 3, 4 or may be transverse to the beams, for example in a horizontal plane for the configuration shown in FIG. 6.

Thus, by the method described with reference to FIG. 6, the first and second component interference patterns are formed in relation to the fibre 8, which are recorded therein so as to produce a combined pattern in which the fibre grating is apodised.

A third method in accordance with the invention will now be described with reference to FIG. 7. In this example, the beams 3 and 4 are directed to the fibre 8 as before, and the fibre is subjected to different levels of longitudinal stress. Piezoelectric devices 220, 230 are attached to opposite ends of the fibre 8. The beams 3, 4 produce an interference pattern in region 7.

Firstly, the fibre is subject to a first relatively low level of stress, during which the piezoelectric devices 220, 230 are unenergized. A first component grating pattern is recorded in the fibre during this period. Thereafter, the devices 220, 230 are energized so that the fibre is stretched by a small amount corresponding to a period Λ of the interference pattern. The interference pattern formed in region 7 is then recorded again as a second component pattern in the fibre 8, with the level of stretching being maintained during exposure for the second pattern. Thereafter, when the exposure is completed, the fibre is released from the piezoelectric devices 220, 230. When the stretching is released, the spatial periodicity of the second pattern becomes slightly compressed as a result of the release of the fibre stress, so that the second pattern has a slightly smaller periodicity than the first pattern. The patterns are arranged so that they are spatially in phase in their central regions, and are 90° out of phase at the opposite ends, so the resulting combination of the first and second patterns recorded during the first and second exposures of the fibre, produces an apodised grating.

In a modification the piezo electric devices 220, 230 are driven by an oscillator (not shown) e.g. at a frequency of about 5 Hz, during the exposure, which may take several minutes. This results in the desired apodised pattern.

Figure 8:
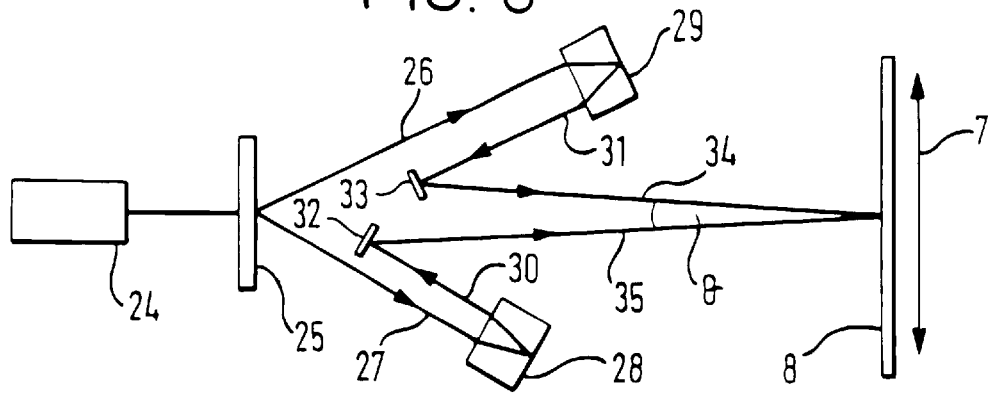
FIG 8. illustrates a method of recording a grating by a fourth method according to the invention.

In the examples of the method according to the invention described so far, the first and second component patterns have been recorded sequentially. However, it is possible to achieve simultaneous recording of the patterns and an example will now be described with reference to FIG. 8.

Figure 9:
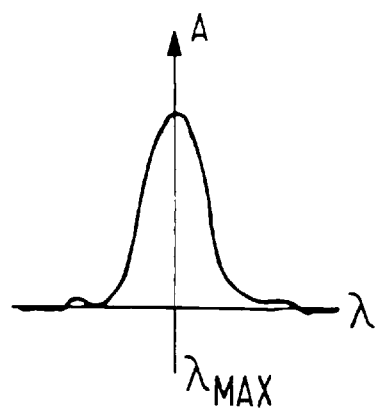
FIG. 9 is a graph of the wavelength distribution of the laser used in the method described with reference to FIG. 8.

Light from a laser source 24 is directed through a phase mask 25, which acts as a beam splitter, so as to form two phase coherent beams 26, 27 which pass through respective reflective corner cubes 28, 29 so as to be reflected back on paths 30, 31 to mirrors 32, 33. The mirrors are adjusted so as to reflect the beams along paths 34, 35 which converge at an angle θ upon the photosensitive optical fibre 8. The spectral content of the output of the laser 24 is shown schematically in FIG. 9 and consists of a narrow Gaussian distribution of wavelengths with a peak wavelength $\lambda_{max}$. The two beams 34, 35 interfere and produce an interference pattern in the region 7 of the fibre. The interference pattern can be considered as a superposition of patterns produced at each of the component wavelengths that makes up the distribution shown in FIG. 9. It can be shown that the resulting superposition gives rise to an apodised grating pattern recorded in the fibre.

Figure 10:
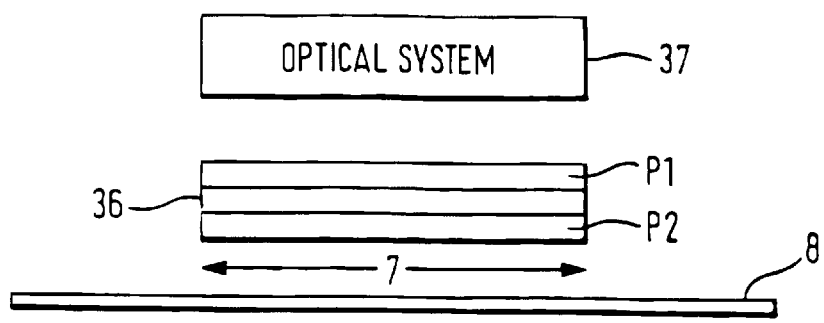
FIG. 10 illustrates apparatus for performing a fifth recording method in accordance with the invention.

A fifth example of a method according to the invention will now be described with reference to FIG. 10. In this example, two holographic phase mask patterns are used to record the first and second component patterns in the fibre 8. The phase mask patterns may be formed one overlying the other in the same phase mask, and, in FIG. 10, the first and second component patterns are shown as patterns P1 and P2 formed in a phase mask 36. An optical system 37 shown schematically, is operable to focus a beam of light either onto the pattern P1 or the pattern P2 and cast a corresponding holographic reference pattern onto optical fibre 8. The optical system 37 thus, records interference patterns derived holographically from the patterns P1, P2 sequentially in the fibre and the result of the two component patterns, when recorded, is to produce a grating which exhibits apodisation.

In a modification, the patterns P1 and P2 may be recorded side by side in the mask 36, and the mask is moved between exposures to align the patterns with the optical source 37 and the fibre 8.

In another modification, a single phase mask pattern P1 is used and the fibre 8 or the phase mask 36 is stretched to produce the second component pattern to be recorded in the fibre. Also instead of stretching, the phase mask can be compressed to alter the periodicity of the pattern P1 so as to provide the second component pattern to be recorded in the optical fibre. The compression technique can also be applied to the optical medium. Although an optical fibre cannot easily be longitudinally compressed, the compression technique is particularly useful for recording apodised gratings in planar waveguides, which cannot readily be stretched but can be longitudinally compressed.

Figure 16:
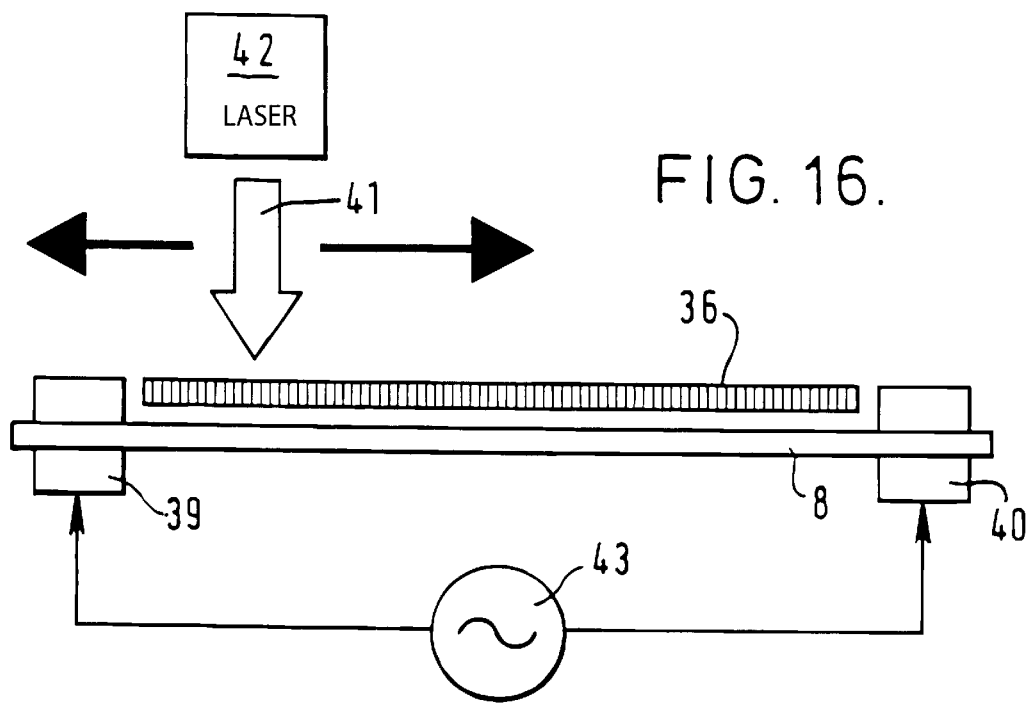
FIG. 16 illustrates an apparatus for performing a sixth method according to the present invention.

A sixth example of the invention will now be described with reference to FIG. 16 in which the fibre 8 is placed immediately behind phase mask 36 and held in chucks in assemblies 39, 40 that include piezo-electric actuators that correspond to the actuators 220, 230 shown in FIG. 7. The phase mask 36 is formed from silica, etched by a standard e-beam technique, with a 100 mm long step-chirped grating with a chirp of 0.75 nm. The grating comprises 200 sections, each 0.5 mm in length, mimicking a near continuous chirp. A beam 41 of UV radiation at 244 nm wavelength is scanned across the phase mask 36 to imprint the grating in the fibre 8. The UV radiation is produced by an intra-cavity frequency-doubled argon ion laser 42.

The phase mask 36 is positioned symmetrically between the chucks 39, 40 so that the centre of the grating experiences zero stretch. The piezo electric actuators are driven by an oscillator 43 at about 5 Hz by a triangular ramp signal ensuring that the fibre 8 at the ends of the phase-mask 36 experiences a stretch amounting to approximately half the period of the grating at those points. In order to achieve a satisfactory symmetric half-period stretch for a given length of grating, the following should be satisfied:

$$f > \frac{v}{w}$$

where f is the frequency of the stretching of the waveguide, v is the scanning speed of the beam and w is the diameter of the beam spot.

It is to be understood that this process can be repeated on the same fibre at different, substantially contiguous locations with the same phase mask to produce a long grating, in which case apodisation by stretching will be applied asymmetrically at the ends of the long pattern. To achieve this, the fibre may be stretched by means of one of the piezoelectric devices only.

Alternatively, phase masks with different spatial periodicities can be used to produce a chirped pattern. The recorded patterns can be matched at their junctions by the apodisation process.

Figure 17:
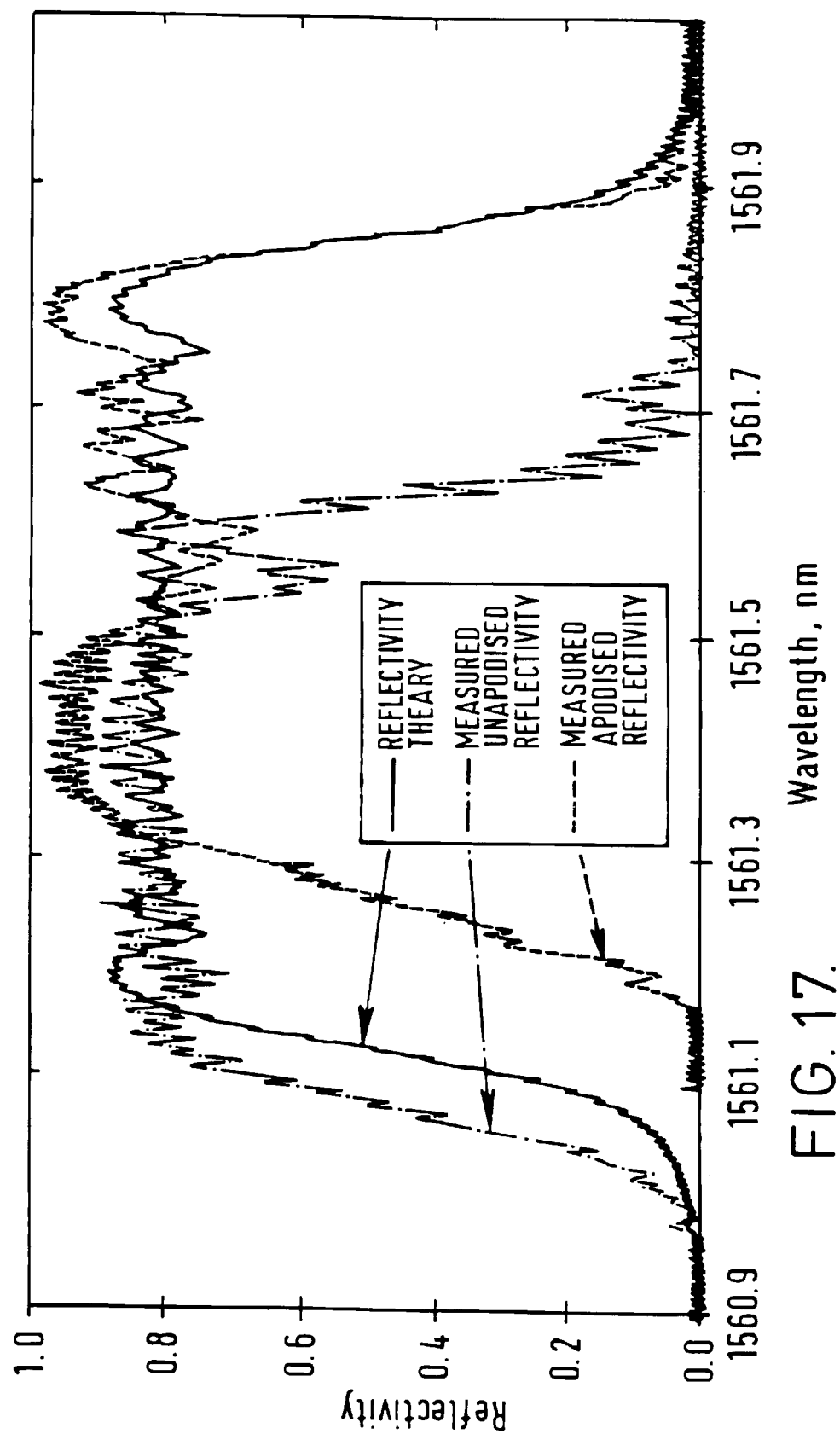
FIG. 17 is a graph of the reflectivity of a grating formed according to the present invention with the actual and predicted reflectivity of a prior art grating or comparison.
Figure 18:
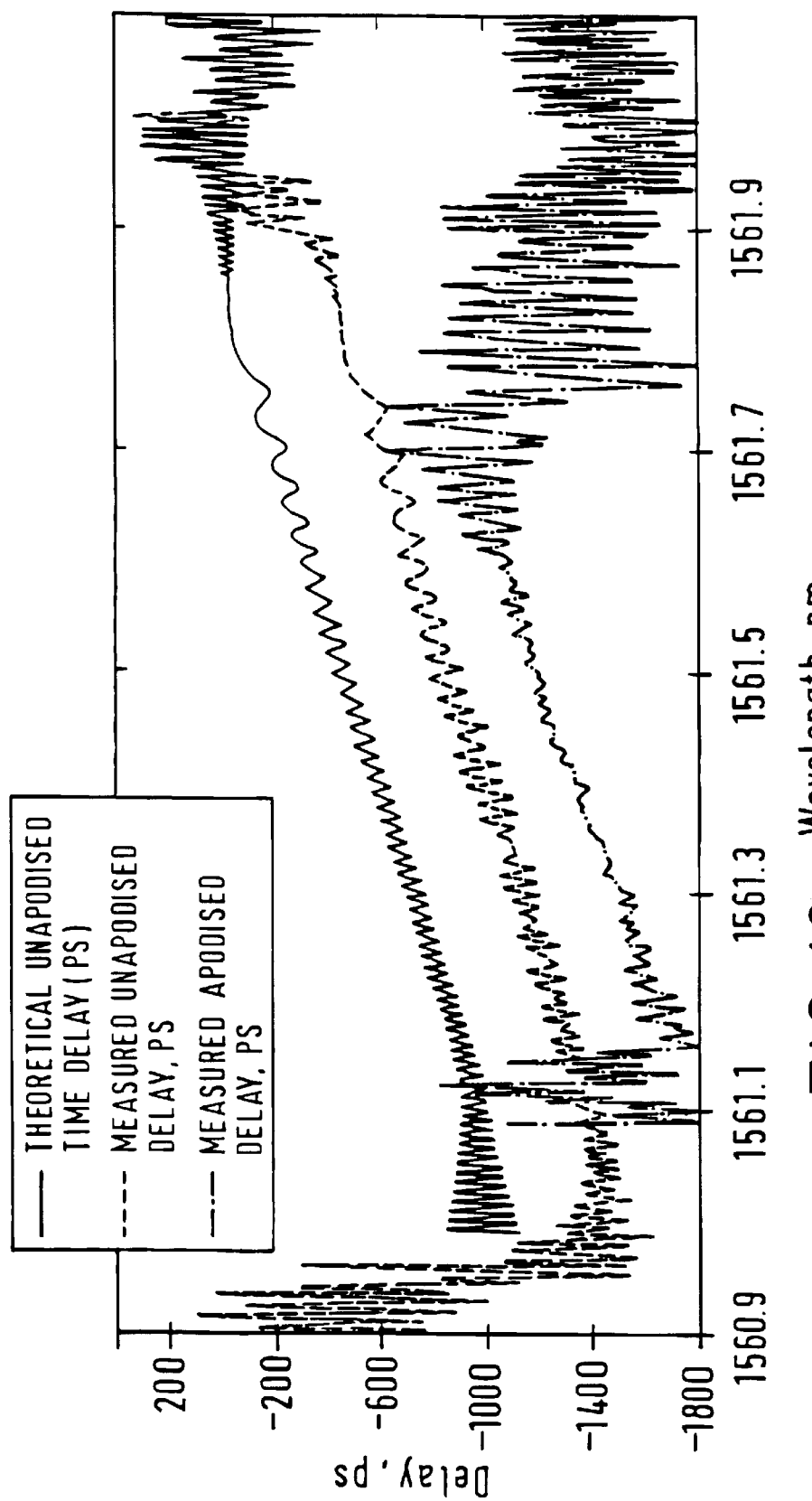
FIG. 18 is a graph showing the delay of a grating formed according to the present invention with the actual and predicted reflectivity of a prior art grating for comparison.

FIGS. 17 and 18 show respectively the reflectivity and delay of a chirp grating made according to the sixth example of the present invention, in comparison with a theoretical prediction produced by means of a computer simulation and the actual performance of a corresponding unapodised grating.

Figure 19:
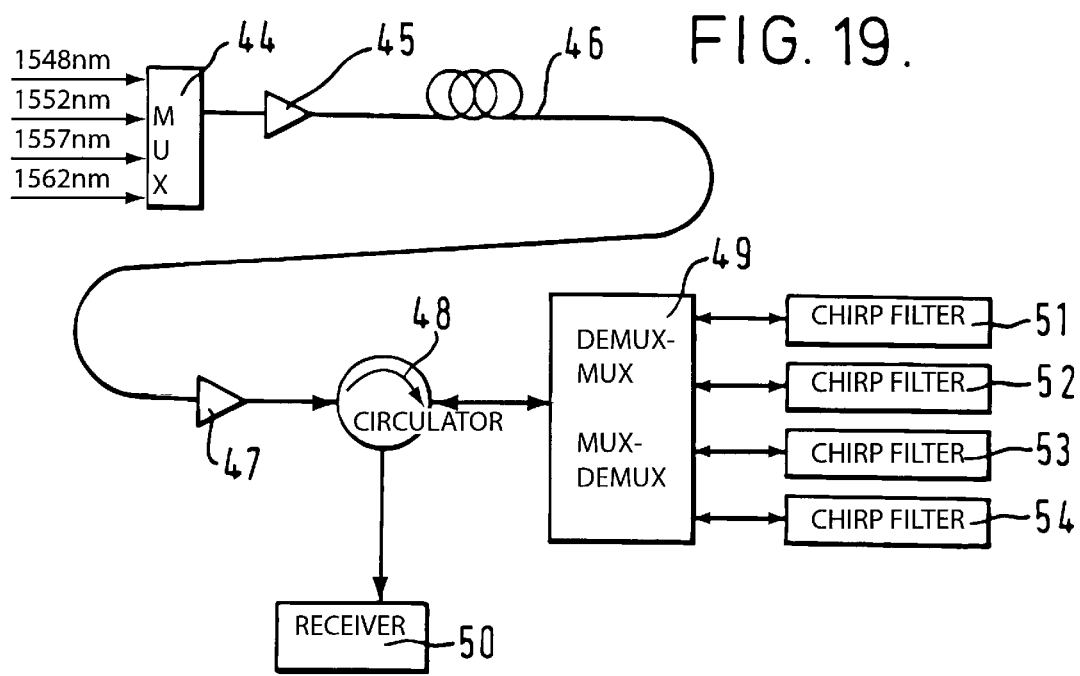
FIG. 19 is a schematic block diagram of a communications system employing gratings made according to the present invention.

Referring to FIG. 19, a WDM system which makes use of apodised grating filters made in accordance with the invention will now be described. A link in an optical communication system comprises a WDM multiplexer 44 and an optical amplifier 45 at a transmitter station. The output of the amplifier 44 is directed to a 120 km length of optical waveguide 46. At a receiver station, an amplifier 47 receives and amplifies optical signals from the waveguide 46 and outputs them to a first port of an optical circulator 48. A second port of the optical circulator 48 is coupled to a bi-directional demultiplexer/multiplexer 49. A third port of the optical circulator 48 is coupled to an optical receiver 50. The demultiplexer/multiplexer 49 is also coupled to four chirp filters 51,52,53,54. Each of the chirp filters 51, . . . , 54 was made by the method described with reference to FIG. 16 and are adapted for compensating for dispersion of signals at respectively 1548 nm, 1552 nm, 1557 nm and 1562 nm. The dispersion parameter of the chirp filters 51, . . . , 54 is 1600 p nm$^{-1}$. The operating bandwidth of the chirp filters is ~3 nm, allowing them to be used over a temperature excursion of ±10° C.

At the transmitter station, optical signals at 1548 nm, 1552 nm, 1557 nm and 1562 nm are combined and applied to the amplifier 45 by the multiplexer 44. The amplifier 45 amplifies the multiplexed signals and launches them into the waveguide 46. During their passage along the waveguide, the optical signals become dispersed.

At the receiver station, the multiplexed signals are boosted by the amplifier 47 and fed to the optical circulator 48 which feeds them from its second port to the demultiplexer/multiplexer 49. The demultiplexer/multiplexer 49 distributes the component signals of the multiplex signal to the chirp filters 51, . . . , 54 which reflect the applied signals in such a manner as to compensate for the dispersion occurring in the waveguide 46. The compensated optical signals are then recombined by the demultiplexer/multiplexer 49 and fed back to the circulator 48 which outputs them at its third port. Finally, the compensated optical signals are received by the optical receiver 50.

With the system of FIG. 19, using data rates in the region of 10 Gb s$^{-1}$, a total bit-rate×distance product of 4.8 Tb s$^{-1}$ km has been achieved. Also over 24 dB of cross-channel isolation has been measured.

Many modifications and variations to the described examples falling within the scope of the claimed invention are possible. For example, gratings formed by the method of the invention may be used in devices other than optical filters. The grating need not be recorded in an optical fibre; it can be recorded in other forms of optical waveguide such as a planar waveguide, or in a bulk optical medium that is not necessarily configured as a waveguide. Also, the grating need not necessarily be of a narrow elongate structure as previously described. The waveguide elements could be disposed as concentric circles, ellipses or other similar shapes, such that the length of the grating extends radially outwardly of the recorded pattern.

What is claimed is:

1. A method, of recording an apodised refractive index grating in a photosensitive optical medium with a pattern of optical radiation, that comprises producing a plurality of spatially periodic component optical interference patterns for recording a sequence of elements that form the grating, with a relative spatial phase which varies along the sequence in such a manner as to result in apodisation of the grating recorded in the optical medium, wherein said relative phase progressively changes in directions away from an intermediate region of the component patterns towards the ends thereof; and wherein the component patterns have zero relative spatial phase in the intermediate region.

2. A method according to claim 1 wherein the component patterns have a relative phase of $\pm\pi/2$ in respect to the spatial periodicity of the patterns, at opposite ends thereof.

3. A method according to claim 1, wherein the intermediate region is disposed centrally of the component patterns.

4. A method of forming a refractive index grating in a photosensitive optical medium, the method including generating a plurality of optical interference patterns, exposing the optical medium to said interference patterns to produce a refractive index grating in said optical medium whose refractive index characteristics are determined by said plurality of interference patterns, controlling the plurality of interference patterns generated so that the refractive index modulation amplitude varies along the grating and is at a minimum towards each end of said grating.

5. A method according to claim 4, wherein said interference patterns are in phase in a region between said ends and out of phase at the ends.

6. A method of recording a refractive index grating in a portion of photosensitive optical medium with a pattern of optical radiation, the method comprising producing a plurality of optical interference patterns for recording in said medium a sequence of refractive index variations that form the grating, with a relative spatial phase which varies along the sequence and having a refractive index modulation amplitude which varies along said grating and is at a minimum towards each end of said grating, wherein said grating has an effective refractive index which is substantially constant along the recorded grating.

7. A method of writing a refractive index grating having first and second ends in a portion of a photosensitive optical material, the method comprising the steps of i) generating at least a first and a second different optical interference patterns, ii) exposing the portion of the photosensitive material to said interference patterns to produce the grating, iii) controlling the optical interference patterns so that they are substantially out of phase with respect to each other at said first end of the grating and at the second end of the grating and substantially in phase at a region of the grating intermediate the first and second ends so that the refractive index modulation amplitude on the grating is at a low level at the ends of the grating and therebetween increases gradually to a significantly higher level intermediate the ends.

8. A method according to claim 7, wherein the first and second interference patterns are generated simultaneously and are applied together to the portion of optical material.

9. A method according to claim 7, wherein the first and second interference patterns are applied sequentially to the portion of optical material.

* * * * *